US012621283B2

(12) United States Patent
Kludy

(10) Patent No.: US 12,621,283 B2
(45) Date of Patent: May 5, 2026

(54) BOOKMARKING SUPPORT FOR FEDERATED LOGIN PAGES

(71) Applicant: Citrix Systems, Inc., Fort Lauderdale, FL (US)

(72) Inventor: Thomas Kludy, Cooper City, FL (US)

( * ) Notice: Subject to any disclaimer, the term of this patent is extended or adjusted under 35 U.S.C. 154(b) by 388 days.

(21) Appl. No.: 17/840,467

(22) Filed: Jun. 14, 2022

(65) Prior Publication Data

US 2023/0403263 A1     Dec. 14, 2023

(51) Int. Cl.
| | |
|---|---|
| *H04L 9/40* | (2022.01) |
| *G06F 21/30* | (2013.01) |
| *G06F 21/31* | (2013.01) |
| *G06F 21/41* | (2013.01) |
| *H04L 67/02* | (2022.01) |

(52) U.S. Cl.
CPC .......... *H04L 63/0815* (2013.01); *G06F 21/30* (2013.01); *G06F 21/31* (2013.01); *G06F 21/41* (2013.01); *H04L 63/0236* (2013.01); *H04L 63/08* (2013.01); *H04L 63/083* (2013.01); *H04L 63/10* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,041,763 B2 * | 10/2011 | Kordun | .............. | G06F 16/9562 |
| | | | | 709/219 |
| 9,374,436 B2 * | 6/2016 | Hershberg | .............. | H04L 67/02 |

| | | | | |
|---|---|---|---|---|
| 10,171,457 B2 * | 1/2019 | Moore | ................ | H04L 63/0807 |
| 10,805,284 B2 * | 10/2020 | Magyar | ................. | H04L 9/3228 |
| 12,375,489 B2 * | 7/2025 | Joshi | ................... | H04L 63/0884 |
| 2004/0002878 A1 * | 1/2004 | Maria Hinton | .... | G06Q 20/3821 |
| | | | | 705/76 |
| 2004/0128561 A1 * | 7/2004 | Bouchat | ............. | H04L 63/0823 |
| | | | | 726/5 |
| 2008/0168539 A1 * | 7/2008 | Stein | ................... | H04L 63/0815 |
| | | | | 726/5 |
| 2008/0263629 A1 * | 10/2008 | Anderson | ............ | H04L 9/3213 |
| | | | | 726/2 |
| 2017/0126649 A1 * | 5/2017 | Votaw | ................. | H04L 63/0815 |
| 2018/0351944 A1 * | 12/2018 | Cho | ..................... | H04L 9/3228 |
| 2019/0058706 A1 * | 2/2019 | Feijoo | .................. | G06F 21/335 |
| 2019/0081943 A1 * | 3/2019 | Yamanakajima | ..... | H04L 63/083 |
| 2019/0141140 A1 * | 5/2019 | Bal | ......................... | H04L 63/08 |
| 2021/0084026 A1 * | 3/2021 | Shaw | ................. | H04L 63/0807 |
| 2021/0136058 A1 * | 5/2021 | Lopez | ................ | H04L 63/0853 |
| 2022/0400108 A1 * | 12/2022 | Rafferty | ............. | H04L 63/0807 |
| 2023/0076454 A1 * | 3/2023 | Pivovarov | .............. | G06F 21/31 |
| 2023/0403152 A1 * | 12/2023 | Feijoo | .................. | H04L 9/0894 |

* cited by examiner

*Primary Examiner* — Lashonda Jacobs-Burton

(57) ABSTRACT

Methods and systems for handling of invalid state parameters during authentication are described herein. A computing device may receive, from a web browser executing on a user device, first data. That data may comprise an indication of authentication of authentication credentials and a first state parameter. Based on that first state parameter being invalid, the computing device may generate a new state parameter and redirect the web browser to a web page associated with an identity provider application. The computing device may then receive, from the web browser, an indication of authentication of a cookie and the new state parameter. The computing device may provide, to the user device, access to one or more services.

20 Claims, 6 Drawing Sheets

BOOKMARKING SUPPORT FOR FEDERATED LOGIN PAGES

FIELD

Aspects described herein generally relate to computer networking, computer authentication, federated authentication, and hardware and software related thereto. More specifically, one or more aspects describe herein provide for the handling of invalid state parameters in federated login environments.

BACKGROUND

A user may, using a web browser executing on a user device, log in to one or more services using a federated login procedure. In this manner, one system (e.g., an API provider) might delegate the task of handling authentication tasks to another system (e.g., a federated login server). For example, to access the one or more services on a first server and at a first domain, the user might be prompted to browse, using the web browser, to a federated login page on a different server and/or different domain. As part of that redirection process, the web browser might be provided (e.g., as part of the redirection Uniform Resource Locator (URL)) a state parameter, which might correspond to a session with the one or more services. At that federated login page, the user might enter authentication credentials and, upon successful authentication of those credentials, the user might be redirected back to the first server and the first domain. As part of that second redirection process, the one or more services on the first server and at the first domain might be provided both the state parameter and an indication that authentication was successful. In this manner, the one or more services on the first server and at the first domain may thereby learn that the user device was successfully authenticated, and the user device may be provided access to the one or more services as part of the session indicated by the state parameter.

One flaw in the above process is that a user cannot bookmark the federated login page. For example, if the user were to bookmark a federated login page to make it easier for them to log in to the one or more services on the first server and at the first domain, then that bookmark may correspond to an invalid (e.g., expired) state parameter. In turn, if a user used the bookmark to access the federated login page and provide the credentials, the user would still be prevented from accessing the one or more services, as the state parameter is invalid. In practice, this might appear to the user as a variety of different errors. For example, the user might be informed that their username and/or password are invalid, even if the username and/or password are correct.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards enabling bookmarking in federated login environments by configuring services to handle circumstances where a state parameter is invalid but where authentication credentials might otherwise be valid.

As will be explained in further detail below, a computing device may receive, from a web browser executing on a user device, first data comprising an indication of authentication, by an identity provider application executing on a second computing device, of user authentication credentials; and a first state parameter that corresponds to a session between the computing device and the user device. That indication of authentication might comprise, for example, a first authentication code. The computing device may then take a number of steps based on determining that the first state parameter is invalid (e.g., determining that the first state parameter is expired). The computing device may generate a new state parameter. For example, the computing device may provide the web browser a second cookie that comprises the new state parameter. Generating the new state parameter may be based on determining that the indication of the authentication of the user authentication credentials indicates that the user authentication credentials were successfully authenticated. Then, the computing device may redirect the web browser to a web page associated with the identity provider application by providing, to the web browser, a uniform resource locator (URL) associated with the identity provider application. That URL may comprise a no retry indication that causes the identity provider application to generate an error if the cookie is invalid, as doing so ensures that an infinite loop is not formed. After, the computing device may receive, from the web browser, second data comprising an indication of authentication, by the identity provider application, of a cookie corresponding to the user authentication credentials and the new state parameter. That indication of authentication may comprise, for example, a second authentication code. The computing device may then provide, to the user device and based on the second data, access to one or more services. Access to those one or more services may be based on information corresponding to the user authentication credentials. For example, the computing device may send, to the identity provider application, the indication of the authentication of the cookie and receive, from the identity provider application, information corresponding to the user authentication credentials. That information may be used to determine which service(s) to provide to the user device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
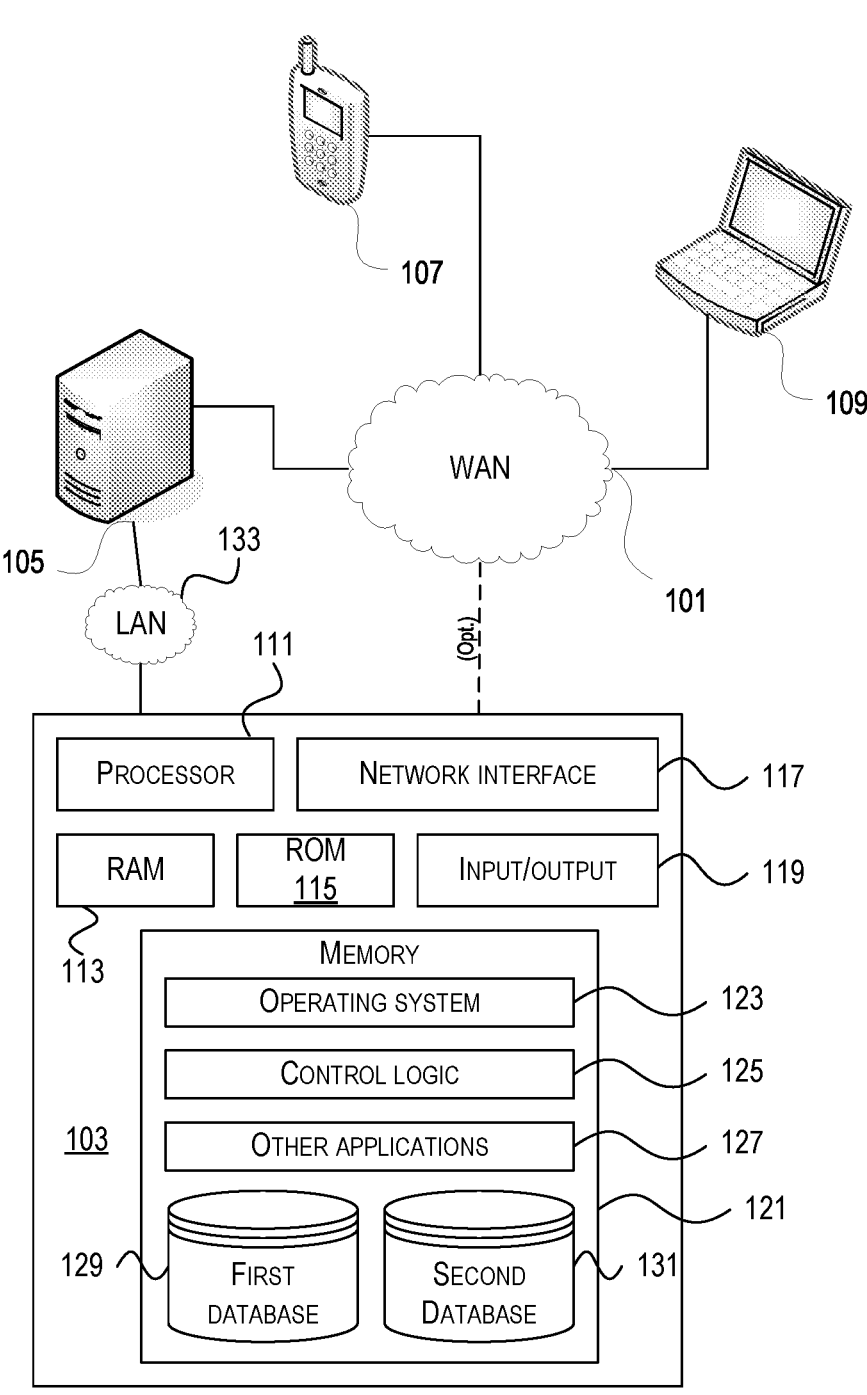
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards configuring service provider servers in a manner that ensures that, even if a user provides an expired state parameter (e.g., by accessing a bookmarked URL for a federated login page that includes an expired state parameter), the user can successfully authenticate and access one or more services. In current federated authentication systems, if a user authenticates with a federated login server (and, e.g., via a federated login page) with an invalid state parameter (e.g., by directly accessing the federated login page using a bookmark to a URL with an expired state parameter), the user might be prevented from accessing a service even if they provide valid authentication credentials. This can confuse and frustrate users, especially since the users are providing valid authentication credentials in what is, from their perspective, the correct login form.

Aspects described herein remedy this situation by configuring service provider servers to generate new state parameters in circumstances where invalid state parameters are detected. More specifically, as detailed further below, service provider servers may be configured such that, when a user device provides a service provider server an invalid (e.g., expired) state parameter, the service provider server is configured to generate a new state parameter and redirect a user device back to the federated login server with the new state parameter. The user device might be re-authenticated (e.g., by checking a cookie associated with the federated login server), and the user device may then be redirected back to the service provider server with the new state parameter and an indication that the user device was successfully authenticated. In this manner, the user device is re-authenticated using a new state parameter, such that the user is provided access to the services. In practice, because such a user is usually already authenticated with the federated login server, this allows the user to be re-authenticated based on a cookie, rather than by re-entering user authentication credentials— in other words, the user need not enter their user authentication credentials twice.

One advantage to the approach described herein is that it avoids requiring any modifications to the federated login server. The process described herein allows users to perform a login process with a federated login server, then quickly remediates issues associated with invalid (e.g., expired) state parameters through a redirection process. This process might not even be noticed by users. Moreover, this process allows a user to bookmark federated login pages for access to specific portions of a service: for example, a user could bookmark a federated login page with a redirect to a specific subdomain and with an indication of an invalid state parameter, and the process will still ensure that the user can complete a login process and access the specific subdomain. In contrast, alternative approaches that involve modifications to the federated login server (e.g., to store information about state parameters to anticipatorily identify circumstances where those state parameters are invalid) have numerous flaws. First, modifying a federated login server can introduce numerous security flaws. For instance, allowing a federated login server to create new state parameters could introduce inconsistencies between state parameters managed by the federated login server and service provider servers, and those inconsistencies could be exploited by malicious actors. Second, tasking the federated login server (instead of the service provider server, as described herein) with managing state parameters can cause the federated login server to lose information about requested subdomains, meaning that users with a bookmark might be inadvertently redirected to a homepage after authentication (rather than the subdomain requested). Third, requiring that federated login servers be modified to handle invalid state parameters could be undesirably cumbersome where multiple federated login servers (e.g., one for Auth0, one for OAuth, one for SAML) are managed by an organization.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
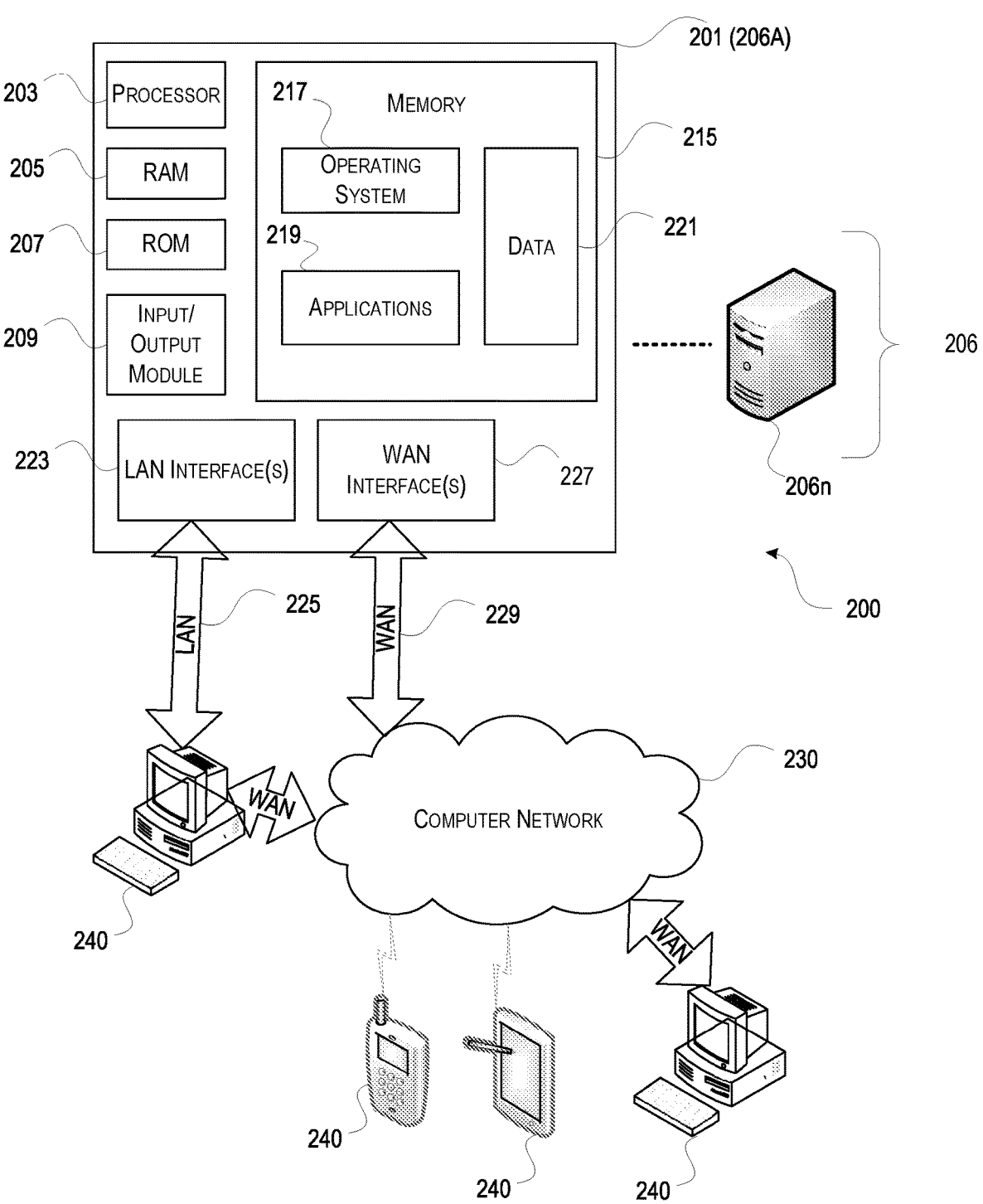
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Federated Login Management

Figure 3:
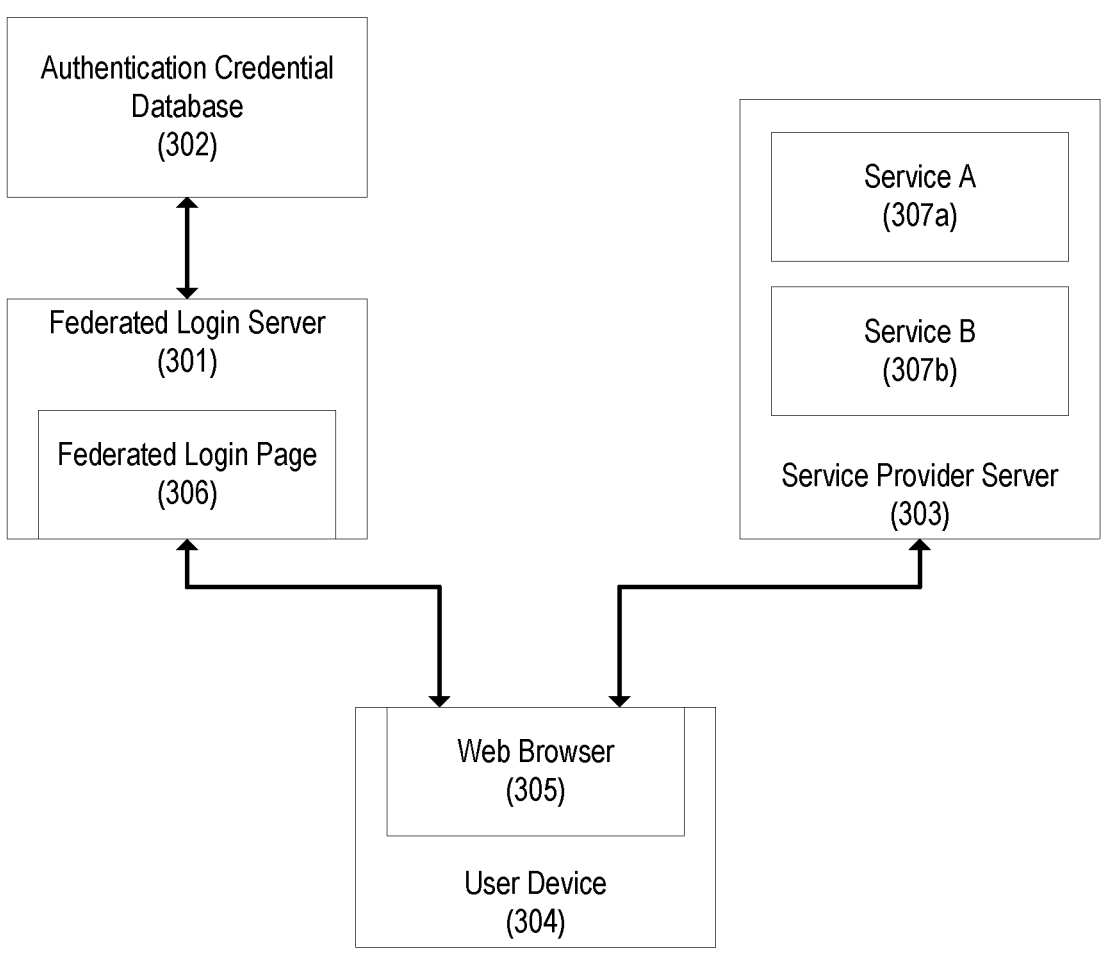
FIG. 3 depicts an illustrative system comprising a user device, a federated login server, and a service provider server.

FIG. 3 depicts an illustrative system for federated authentication. FIG. 3 includes a federated login server 301 that provides a federated login page 306, an authentication credential database 302 communicatively coupled to the federated login server, a user device 304 executing a web browser 305, and a service provider server 303 comprising two services: a service A 307a, and a service B 307b. One or more of the federated login server 301, the authentication credential database 302, the service provider server 303, and/or the user device 304 may be all or portions of a computing device, such as one or more of the devices 103, 105, 107, and/or 109 of FIG. 1, and/or the client device 240 and/or server 206 of FIG. 2. Additionally and/or alternatively, one or more of the federated login server 301, the authentication credential database 302, the service provider server 303, and/or the user device 304 may be one or more computing devices that comprise one or more processors and memory storing instructions that, when executed by the one or more processors, cause performance of one or more steps. Additionally and/or alternatively, one or more of the tasks performed by one or more of the federated login server 301, the authentication credential database 302, the service provider server 303, and/or the user device 304 may be implemented by one or more non-transitory computer-readable media.

The federated login server 301 may be configured to handle the authentication of the user device 304 when the user device 304 requests access to any of the services provided by the service provider server 303. The user device 304 may, via the web browser 305, access one or more web pages associated with the service provider server 303 and/or may request access to one or more services provided by the service provider server 303. In response, the service provider server 303 may redirect the web browser 305 of the user device 304 to the federated login page 306 provided by the federated login server 301. As part of that redirection, the service provider server may generate a state parameter, and the URL to which the web browser 305 is redirected may comprise that state parameter. A user of the user device may then provide authentication credentials to the federated login page 306 via the web browser 305. For example, the user may enter a username, password, two-factor authentication code, or similar information into one or more fields provided via the federated login page 306. The federated login server 301 may determine whether these provided authentication credentials are correct by comparing these credentials to data stored in the authentication credential database 302. In the event that the authentication credentials are not correct, the federated login server 301 may send the user device 304 an error code and/or otherwise may prevent access, by the user device 304, to the services provided by the service provider server 303. Ion the other hand, if the authentication credentials are correct, the federated login server 301 may redirect the web browser 305 of the user device 304 to a URL associated with the service provider server 303. That URL may indicate the state parameter and/or an indication that authentication was successful. The federated login server may additionally and/or alternatively provide the web browser 305 a cookie that confirms successful authentication of the user device 304 by the federated login server 301. Once redirected to the service provider server 303, the service provider server 303 may provide the user device 304 access to one or more services based on successful authentication of the user device 304 by the federated login server 301. Those services might be provided as part of a session associated with the state parameter.

The user device 304 may be any computing device, such as a smartphone, a laptop, a desktop computer, a tablet, a virtual reality device, or the like. In turn, the web browser 305 executed by the user device 304 may be any form of web browser, such as a desktop web browser. That said, the web browser 305 need not be a traditional desktop web browser. For example, the web browser 305 may be part of an application software suite that includes the functionality to access and/or display web pages and/or content available at URLs.

The federated login server 301 may comprise a server and/or network of services which implement authentication processes on behalf of other services. The federated login server 301 might provide authentication services in accordance with one or more authentication protocols, such as the OAuth Protocol, the Auth0 protocol, the Security Assertion Markup Language (SAML) protocol, or the like. The federated login server 301 may provide a wide variety of authentication services in accordance with a wide variety of protocols. Along those lines, the federated login server 301 may be a series of different servers, each providing authentication services in accordance with one or more different protocols. The federated login login page 306 might be hosted elsewhere, such as on another server.

The service provider server 303 may be any server, such as a resource server, that provides one or more services. A service may comprise, for example, one or more Application Programming Interfaces (APIs), files such as text files, video files, and/or audio files, web pages, or the like. For example, the service provider server 303 may provide APIs associated with a fitness tracker, with the service A 307a being a weight tracking API and the service B 307b being a step tracking API. As another example, the service provider server 303 may be a video streaming platform, with the service A 307a being a first movie and the service B 307b being a first television show.

The authentication credential database 302 may be a database configured to store data which enables the federated login server 301 to confirm the authenticity and/or validity of user authentication credentials. For example, the authentication credential database 302 may comprise hashes that were generated, using a one-way hashing algorithm, based on passwords for user accounts. In turn, to confirm whether a submitted password is valid, the federated login server 301 may perform the one-way hashing algorithm on the submitted password, then compare the resulting hash value to one or more hash values stored by the authentication credential database 302.

Figure 4A:
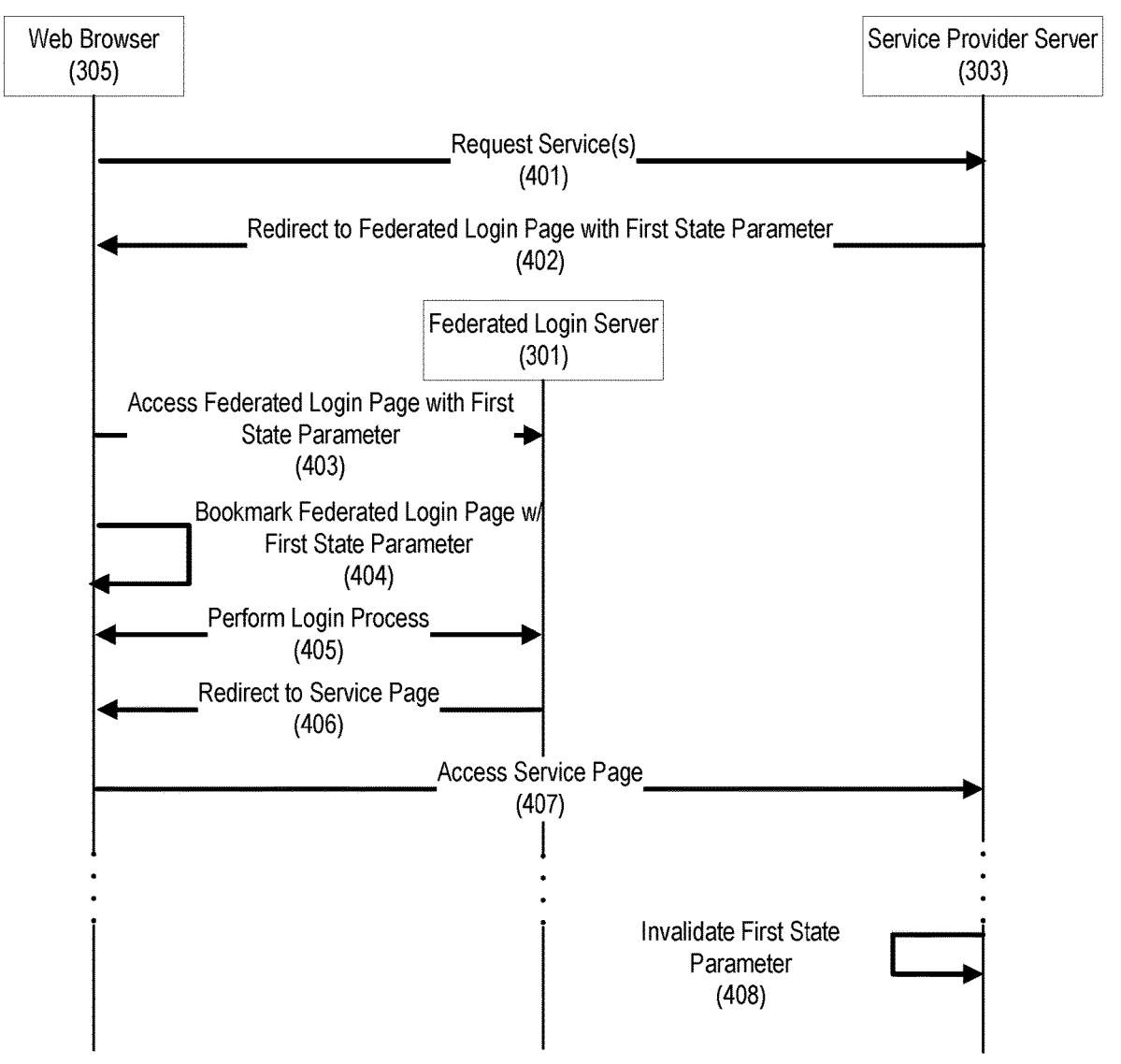
FIG. 4A depicts a messaging diagram with steps involving using a federated login server to authenticate a user requesting access to a service provider server.

FIG. 4A depicts a messaging diagram with steps involving using a federated login server to authenticate a user requesting access to a service provider server. The messaging diagram depicted in FIG. 4A shows three elements from FIG. 3: the web browser 305 (which executes on the user device 304), the federated login server 301, and the service provider server 303. With that said, more or fewer devices may be involved. For example, as indicated above, there may be a plurality of federated login servers, each providing authentication in conformance with a different authentication protocol. As another example, the federated login server 301 and the service provider server 303 may execute on the same computing device (e.g., the same server blade, the same cloud computing network), such that transmissions between the federated login server 301 and the service provider server 303 may be performed through software.

In step 401, the web browser 305 may request one or more services from the service provider server 303. For example, the user of the user device 304 may request, from the service provider server 303, access to the service A 307*a* and/or the service B 307*b*. Requesting one or more services from the service provider server 303 may comprise access, via the web browser 305, of a URL. For example, a user may enter the domain "citrix.cloud.com" into a field in the web browser 305, causing the web browser to execute a "GET: citrix.cloud.com no auth" command.

In step 402, the service provider server 303 may redirect the web browser 305 to the federated login page 306 of the federated login server 301. That redirection may comprise providing, to the web browser 305, a first state parameter. The state parameter may be provided in a URL (e.g., as a variable included in the URL that redirects the web browser 305 to the federated login page 306), as a cookie (e.g., a cookie to be stored in memory of the user device 304), or the like. For example, following the example provided in step 401, the service provider server 303 may redirect the web browser 305 and provide the web browser 305 a cookie using the command "redirect: accounts.cloud.com?redirect_url=citrix.cloud.com/ oauth&state=[STATE PARAMETER] Set-Cookie: state= [STATE PARAMETER]; Domain=citrix.cloud.com; HttpOnly; Secure; Max-Age=N."

In step 403, the web browser 305 may access the federated login page 306 of the federated login server 301. As part of accessing that federated login page 306, the web browser 305 may send an indication of the first state parameter to the federated login server 301. For example, the URL via which the web browser 305 accesses the federated login page 306 may comprise an indication of the first state parameter. As another example, the web browser 305 may provide, to the federated login server 301, a cookie comprising the first state parameter. As yet another example, and returning to the example provided in the previous paragraph, the web browser 305 may execute "GET accounts.cloud.com?redirect_url=citrix.cloud.com/oauth& state=[STATE PARAMETER]."

In step 404, the web browser 305 may bookmark a URL corresponding to the federated login page 306 of the federated login server 301. This bookmark may comprise an indication of the first state parameter. For example, the first state parameter may be part of the URL bookmarked by the web browser 305. For instance, returning to the example provided above, the web browser 305 may bookmark "accounts.cloud.com?redirect_url=citrix.cloud.com/ oauth&state=[STATE PARAMETER]." As will be described in more detail below, this bookmark would ordinarily cause trouble for a user, as it would provide a potentially expired state parameter to the federated login server 301. That said, as will be described in more detail with respect to FIG. 5, this problem can be remediated in accordance with the processes described herein.

In step 405, the web browser 305 and the federated login server 301 may perform a login process. The particular nature of this process may depend on the nature of the authentication credentials provided by a user, the authentication protocol(s) implemented by the federated login server 301, and the like. For example, a user may, via the web browser 305, provide a username and password by entering that information into one or more fields provided in the federated login page 306, then click a submit button to send such information to the federated login server 301. Then, as part of that process, the federated login server 301 may use data stored in the authentication credential database 302 to confirm whether or not the authentication credentials submitted by the user are valid.

In step 406, the federated login server 301 may redirect the web browser 305 to a page associated with the service provider server 303. The page may be, for example, a landing page for authenticated users, an internal page providing access to one or more APIs provided by the service provider server 303, or the like. For example, returning to the example provided above, the web browser 305 may be redirected to "citrix.cloud.com/oauth?state=[STATE PARAMETER]." As part of this process, the web browser 305 may be provided a cookie, such as one that comprises the state parameter.

In step 407, the web browser 305 may access the service page provided by the service provider server 303. For example, the web browser 305 may request and retrieve the web page by accessing a URL (e.g., "citrix.cloud.com/ oauth?state=[STATE PARAMETER]") specified by the redirection indicated in step 406. In turn, the service provider server 303 may receive, from the web browser 305, data. The data may comprise, for example, an indication of authentication, by an identity provider application executing on a second computing device, of user authentication credentials. That indication of authentication of the user authentication credentials may comprise a first authentication code, such as a string uniquely representing the fact that the user device 304 was successfully authenticated. Additionally and/or alternatively, the data may comprise the first state parameter.

In step 408, and potentially some time later after step 407, the first state parameter may be invalidated by the service provider server 303. State parameters may expire after a period of time, after a user manually logs out of their account, or based on similar considerations. As will be described in detail with respect to FIG. 4B (discussed below), this can cause issues in conjunction with the bookmark created in step 404: because the user's bookmark may point to an invalid state parameter, that invalid state parameter might no longer be usable for the purposes of subsequent authentication.

Figure 4B:
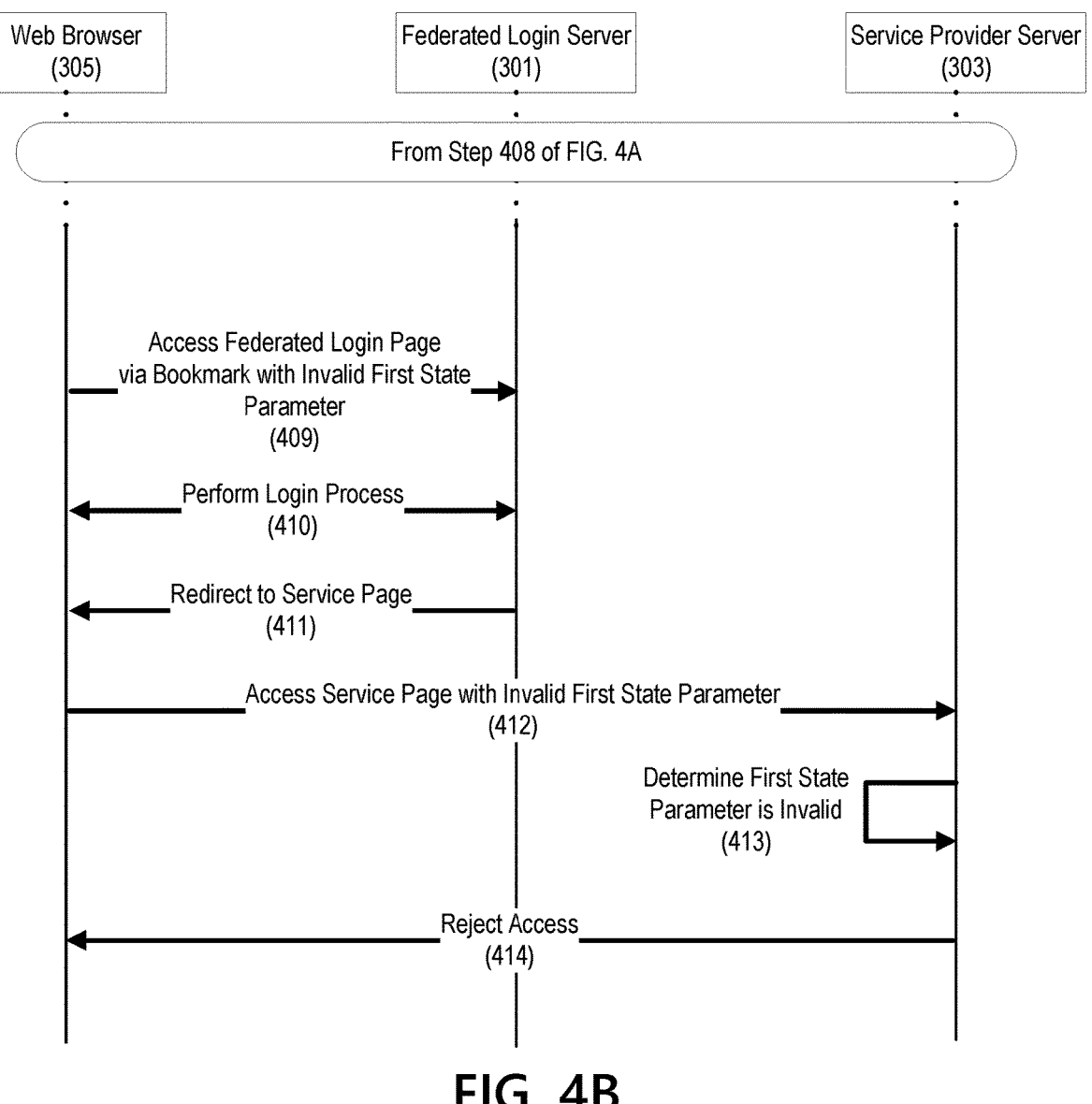
FIG. 4B depicts a messaging diagram with steps showing how a bookmark with an expired state parameter could cause a user to be rejected during authentication, even if the user provides valid authentication credentials.

FIG. 4B depicts a messaging diagram with steps showing how a bookmark with an expired state parameter could cause a user to be rejected during authentication, even if the user provides valid authentication credentials. Stated differently, FIG. 4B depicts a circumstance which is avoided by the improvements of the present invention, described in more detail in FIG. 5 (below). FIG. 4B may logically follow from step 408 of FIG. 4A.

In step 409, the web browser 305 may access the federated login page 306 via the bookmark created in step 404 of FIG. 4A. For example, returning to the example discussed above with respect to FIG. 4A, the user may use the bookmark pointing to "accounts.cloud.com?redirect_url=citrix.cloud.com/oauth&state=[STATE PARAMETER]." As such, the web browser 305 may access the federated login page 306 in a manner which provides, to the federated login server 301, the first state parameter that was invalidated in (e.g., that expired in) step 408 of FIG. 4A. This begins a process whereby authentication will, as depicted in this figure, ultimately fail because the first state parameter has been invalidated.

In step 410, the web browser 305 and the federated login server 301 may perform a login process. This step may be the same or similar as step 405 of FIG. 4A. Along those lines, the user may provide valid authentication credentials, and the federated login server 301 may determine that authentication is successful. That said, despite this successful authentication, as will be described below, the process will ultimately fail due to the invalid nature of the first state parameter.

In step 411, the federated login server 301 may redirect the web browser 305 to a page associated with the service provider server 303. For example, the user might be redirected to "citrix.cloud.com/oauth?state=[STATE PARAMETER]." This step may be the same or similar as step 406 of FIG. 4A, except that the first state parameter may be invalid.

In step 412, the web browser 305 may access the service page provided by the service provider server 303. This step may be the same or similar as step 407 of FIG. 4A.

In step 413, the service provider server 303 may determine that the first state parameter is invalid. For example, the service provider server 303 may extract the state parameter from the URL provided by the web browser 305 and/or may extract the state parameter from a cookie maintained by the web browser 305, then determine that the state parameter is invalid. Determining that the first state parameter is invalid may comprise comparing the first state parameter to a database of state parameters. For example, the database may indicate that the first state parameter expired at a particular time.

In step 414, the service provider server 303 may send, to the web browser 305, an indication that access to the one or more services has been rejected. For example, the web browser 305 may be provided a notification that login has failed. As part of this process, the user device 304 may be prevented from accessing services such as the service A 307*a* and the service B 307*b*.

Discussion will now turn to steps which may be taken to avoid the circumstances depicted in FIG. 4B. In other words, discussion will turn to how a user may be successfully authenticated even where the user inadvertently provides an invalid state parameter.

Figure 5:
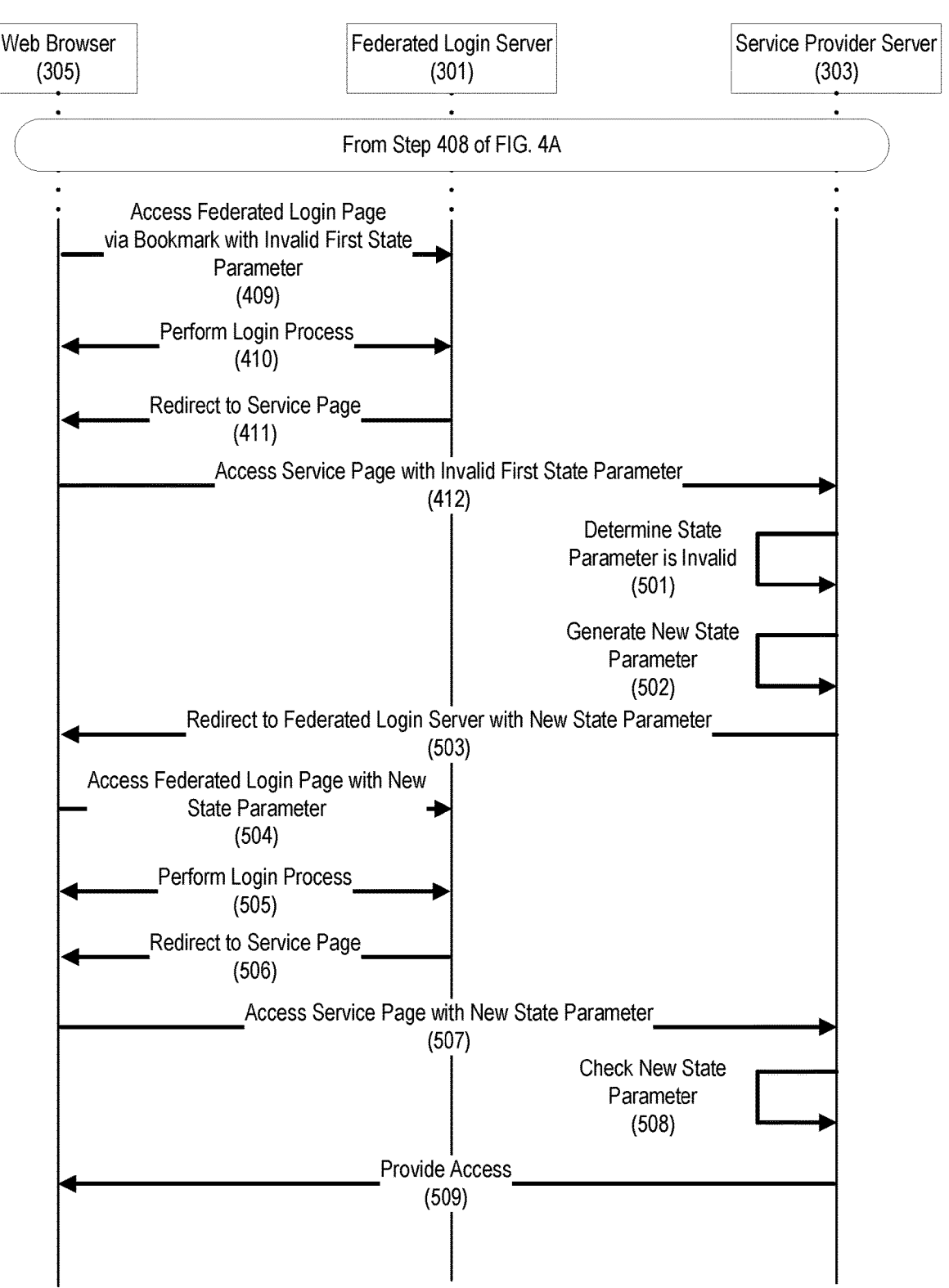
FIG. 5 depicts a messaging diagram with steps involving handling user authentication such that, even if a user accesses a federated login page with an expired state parameter, the user can successfully authenticate and access one or more services.

FIG. 5 depicts a messaging diagram with steps involving handling user authentication such that, even if a user accesses a federated login page with an invalid (e.g., expired) state parameter, the user can successfully authenticate and access one or more services. Stated differently, FIG. 5 depicts a circumstance whereby the service provider server 303 remediates a circumstance where a user provides (e.g., via a bookmark) an invalid state parameter but provides otherwise genuine authentication credentials. FIG. 5 may logically follow from step 408 of FIG. 4A.

Steps 409-412 may be the same or similar as steps 409-412 of FIG. 4B. In other words, in these steps, a user inadvertently provides an invalid state parameter to the federated login server 301, but may otherwise authenticate using valid authentication credentials.

In step 501, the service provider server 303 may determine that the state parameter is invalid (e.g., that the state parameter has expired). As part of this process, the service provider server 303 may extract the state parameter from the URL provided by the web browser 305 and/or may extract the state parameter from a cookie maintained by the web browser 305, then determine that the state parameter is invalid. For example, the web browser 305 may access "accounts.cloud.com?redirect_url=citrix.cloud.com/oauth&state=[STATE PARAMETER]," but the state parameter indicated in that URL may be invalid (e.g., expired), such that the service provider server 303 may extract that state parameter and determine that it is expired. Determining that the first state parameter is invalid may comprise comparing the first state parameter to a database of state parameters. For example, the database may indicate that the first state parameter expired at a particular time.

In step 502, the service provider server 303 may generate a new state parameter. For example, based on determining that a first state parameter is invalid, the service provider server 303 may generate a new state parameter. That new state parameter may correspond to a new session between the user device 304 and the service provider server 303, and/or may correspond to an existing session (e.g., the session indicated by the now-invalid state parameter) between the user device 304 and the service provider server 303.

In step 503, the service provider server 303 may redirect the web browser 305 to the federated login server 301. As part of this redirection, the web browser may be provided the new state parameter generated in step 502. For example, the service provider server 303 may redirect the web browser 305 to a web page associated with the identity provider application by providing, to the web browser, a URL associated with the identity provider application. That URL may comprise the new state parameter. For instance, the service provider server 303 may send the command "redirect: accounts.cloud.com?redirect_url=citrix.cloud.com/oauth@state=[NEW STATE PARAMETER].noretry" to the web browser 305. Additionally and/or alternatively, the service provider server 303 may provide the web browser 305 a second cookie that comprises the new state parameter. For example, the service provider server 303 may send the command "Set-Cookie: session=[NEW STATE PARAMETER]; domain=citrix.cloud.com; HttpOnly; Secure; Max-Age=N" to the web browser 305.

The URL to which the web browser 305 is redirected may comprise a no retry indication. Because the service provider server 303 is configured to redirect the web browser 305 back to the federated login page 306 in response to determining that a state parameter is invalid, and because the federated login page 306 will redirect the web browser 305 back to the service provider server 303 based on determining that the web browser 305 stores a cookie indicating that authentication was successful, it is possible that the web browser 305 could be put into an endless loop (e.g., where the state parameter generated in step 502 is invalid due to misconfiguration or the like). The no retry indication may cause the federated login server 301 to generate an error if the cookie is invalid, rather than to redirect the web browser 305 back to the federated login server 301.

In step 504, the web browser 305 may access the federated login page 306 based on the redirection received in step 503. For example, the web browser 305 may access the URL "accounts.cloud.com?redirect_url=citrix.cloud.com/oauth@state=[NEW STATE PARAMETER].noretry." As part of that process, the web browser 305 may provide, to the federated login server 301, the new state parameter generated in step 502. Providing the new state parameter to the federated login server 301 may be via a URL (e.g., where the new state parameter is in the URL), via a cookie (e.g., where the service provider server 303 provided the web browser 305 a second cookie that comprises the new state parameter), or the like.

In step 505, the web browser 305 and the federated login server 301 may perform a login process. This step may be the same or similar as step 405 of FIG. 4A, except involving the new state parameter generated in step 502. Critically, the login process in step 505 need not be the same as the login process of step 410. For example, as part of step 410, a user might have provided a valid username and a valid password, and in exchange may have been successfully authenticated by the federated login server 301. As part of that successful authentication in step 410, the web browser 305 may have been provided a cookie that indicates the successful authentication between the user device 304 and the federated login server 301. In turn, step 505 need not involve authentication of authentication credentials, but may instead involve authentication of the cookie provided as part of step 410. This may advantageously speed up the process depicted in FIG. 5: the user might not be required to re-enter user authentication credentials that they already provided as part of step 410.

In step 506, the federated login server 301 may redirect the web browser 305 to a page associated with the service provider server 303. The redirection may involve indicating, to the service provider server 303, both the new state parameter and an indication of whether the authentication in step 505 was successful. For example, the federated login server 301 may redirect the web browser 305 to "citrix.cloud.com/oauth?code=[AUTH CODE]&state=[NEW STATE PARAMETER].noretry." This step may be the same or similar as step 406 of FIG. 4A, except involving the new state parameter generated in step 502.

In step 507, the web browser 305 may access the service page provided by the service provider server 303. For example, the web browser may access "citrix.cloud.com/oauth?code=[SUCCESSFUL AUTH CODE] &state=[NEW STATE PARAMETER].noretry." This step may be the same or similar as step 407 of FIG. 4A. As part of this process, the service provider server 303 may receive second data. That second data may comprise, for example, an indication of authentication, by the identity provider application, of a cookie corresponding to the user authentication credentials. That indication of authentication of the cookie may comprise a second authentication code, such as a second string uniquely representing the fact that the user device 304 was successfully authenticated. Additionally and/or alternative, the second data may comprise the new state parameter.

In step 508, the service provider server 303 may check whether the new state parameter is valid. In the circumstance depicted in FIG. 5, because the new state parameter generated in step 502 was recently generated, the new state parameter generated in step 502 will be found valid (absent extenuating circumstances, like an excessively long delay between step 502 and step 508).

In step 509, the service provider server 303 may provide, to the user device 304 (and, e.g., to the web browser 305), access to one or more services. For example, the service provider server 303 may provide, to the user device 304 and based on the second data, access to one or more services, such as the service A 307*a* and/or the service B 307*b*. The user device 304 may be provided access to such services based on successful authentication in step 505. In other words, if the login process in step 505 fails for some reason, the user device 304 may be prevented from accessing the services. In contrast, if the login process in step 505 is successful, the user device 304 may be provided access to one or more of the services.

As part of providing access to the one or more services, the service provider server 303 may determine information about the user device 304. The service provider server 303 may send, to the federated login server 301, the indication of the authentication of the cookie as part of step 505. In turn, the service provider server 303 may receive, from the federated login server 301, information corresponding to the user authentication credentials. That information may indicate a name associated with the user authentication credentials, an e-mail address associated with the user authentication credentials, a telephone number associated with the user authentication credentials, or the like. In turn, the service provider server 303 may provide the access to the one or more services based on the information corresponding to the user authentication credentials. For example, the e-mail address associated with the user may be used as part of an API call provided by the service provider server 303.

The following paragraphs (M1) through (M7) describe examples of methods that may be implemented in accordance with the present disclosure.

(M1) A method comprising receiving, by a computing device and from a web browser executing on a user device, first data comprising: an indication of authentication, by an identity provider application executing on a second computing device, of user authentication credentials; and a first state parameter that corresponds to a session between the computing device and the user device; and based on determining that the first state parameter is invalid: generating a new state parameter; redirecting the web browser to a web page associated with the identity provider application by providing, to the web browser, a uniform resource locator (URL) associated with the identity provider application; receiving, from the web browser, second data comprising: an indication of authentication, by the identity provider application, of a cookie corresponding to the user authentication credentials; and the new state parameter; and providing, to the user device and based on the second data, access to one or more services.

(M2) A method may be performed as described in paragraph (M1) wherein the determining that the first state parameter is invalid comprises: determining that the first state parameter is expired.

(M3) A method may be performed as described in paragraph (M1) or (M2), wherein the generating the new state parameter comprises: providing the web browser a second cookie that comprises the new state parameter.

(M4) A method may be performed as described in any one of paragraphs (M1)-(M3), wherein the URL comprises a no retry indication that causes the identity provider application to generate an error if the cookie is invalid.

(M5) A method may be performed as described in any one of paragraphs (M1)-(M4), wherein the indication of the authentication of the user authentication credentials comprises a first authentication code, and wherein the indication of the authentication of the cookie comprises a second authentication code.

(M6) A method may be performed as described in any one of paragraphs (M1)-(M5), further comprising: sending, to the identity provider application, the indication of the authentication of the cookie; and receiving, from the identity provider application, information corresponding to the user authentication credentials, wherein providing the access to the one or more services is based on the information corresponding to the user authentication credentials.

(M7) A method may be performed as described in any one of paragraphs (M1)-(M6), wherein the generating the new state parameter is based on determining that the indication of the authentication of the user authentication credentials indicates that the user authentication credentials were successfully authenticated.

The following paragraphs (A1) through (A7) describe examples of apparatuses that may be implemented in accordance with the present disclosure.

(A1) A computing device comprising: one or more processors; and memory storing instructions that, when executed by the one or more processors, cause the computing device to: receive, from a web browser executing on a user device, first data comprising: an indication of authentication, by an identity provider application executing on a second computing device, of user authentication credentials; and a first state parameter that corresponds to a session between the computing device and the user device; and based on determining that the first state parameter is invalid: generate a new state parameter; redirect the web browser to a web page associated with the identity provider application by providing, to the web browser, a uniform resource locator (URL) associated with the identity provider application; receive, from the web browser, second data comprising: an indication of authentication, by the identity provider application, of a cookie corresponding to the user authentication credentials; and the new state parameter; and provide, to the user device and based on the second data, access to one or more services.

(A2) The computing device as described in paragraph (A1), wherein the instructions, when executed by the one or more processors, cause the computing device to determine that the first state parameter is invalid by causing the computing device to: determine that the first state parameter is expired.

(A3) The computing device as described in any one of paragraphs (A1)-(A2), wherein the instructions, when executed by the one or more processors, cause the computing device to generate the new state parameter by causing the computing device to: provide the web browser a second cookie that comprises the new state parameter.

(A4) The computing device as described in any one of paragraphs (A1)-(A3), wherein the URL comprises a no retry indication that causes the identity provider application to generate an error if the cookie is invalid.

(A5) The computing device as described in any one of paragraphs (A1)-(A4), wherein the indication of the authentication of the user authentication credentials comprises a first authentication code, and wherein the indication of the authentication of the cookie comprises a second authentication code.

(A6) The computing device as described in any one of paragraphs (A1)-(A5), wherein the instructions, when executed by the one or more processors, further cause the computing device to: send, to the identity provider application, the indication of the authentication of the cookie; and receive, from the identity provider application, information corresponding to the user authentication credentials, wherein the instructions, when executed by the one or more processors, further cause the computing device to provide the access to the one or more services based on the information corresponding to the user authentication credentials.

(A7) The computing device as described in any one of paragraphs (A1)-(A6), wherein the instructions, when executed by the one or more processors, further cause the computing device to generate the new state parameter based on determining that the indication of the authentication of the user authentication credentials indicates that the user authentication credentials were successfully authenticated.

The following paragraphs (CRM1) through (CRM7) describe examples of computer-readable media that may be implemented in accordance with the present disclosure.

(CRM1) One or more non-transitory computer-readable media storing instructions that, when executed by one or more processors of a computing device, cause the computing device to: receive, from a web browser executing on a user device, first data comprising: an indication of authentication, by an identity provider application executing on a second computing device, of user authentication credentials; and a first state parameter that corresponds to a session between the computing device and the user device; and based on determining that the first state parameter is invalid: generate a new state parameter; redirect the web browser to a web page associated with the identity provider application by providing, to the web browser, a uniform resource locator (URL) associated with the identity provider application; receive, from the web browser, second data comprising: an indication of authentication, by the identity provider application, of a cookie corresponding to the user authentication credentials; and the new state parameter; and provide, to the user device and based on the second data, access to one or more services.

(CRM2) The one or more non-transitory computer-readable media described in paragraph (CRM1), wherein the instructions, when executed by the one or more processors, cause the computing device to determine that the first state parameter is invalid by causing the computing device to: determine that the first state parameter is expired.

(CRM3) The one or more non-transitory computer-readable media described in any one of paragraphs (CRM1)-(CRM2), wherein the instructions, when executed by the one or more processors, cause the computing device to generate the new state parameter by causing the computing device to: provide the web browser a second cookie that comprises the new state parameter.

(CRM4) The one or more non-transitory computer-readable media described in any one of paragraphs (CRM1)-(CRM3), wherein the URL comprises a no retry indication that causes the identity provider application to generate an error if the cookie is invalid.

(CRM5) The one or more non-transitory computer-readable media described in any one of paragraphs (CRM1)-(CRM4), wherein the indication of the authentication of the user authentication credentials comprises a first authentication code, and wherein the indication of the authentication of the cookie comprises a second authentication code.

(CRM6) The one or more non-transitory computer-readable media described in any one of paragraphs (CRM1)-(CRM5), wherein the instructions, when executed by the one or more processors, further cause the computing device to: send, to the identity provider application, the indication of the authentication of the cookie; and receive, from the identity provider application, information corresponding to the user authentication credentials, wherein the instructions, when executed by the one or more processors, further cause the computing device to provide the access to the one or more services based on the information corresponding to the user authentication credentials.

(CRM7) The one or more non-transitory computer-readable media described in any one of paragraphs (CRM1)-(CRM6), wherein the instructions, when executed by the one or more processors, further cause the computing device to generate the new state parameter based on determining that the indication of the authentication of the user authentication credentials indicates that the user authentication credentials were successfully authenticated.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising: one or more processors and memory storing instructions that, when executed by the one or more processors, cause the computing device to:
   receive, from a web browser executing on a user device, first data comprising:
   an indication of authentication, by an identity provider application executing on a second computing device, of user authentication credentials, and
   a first state parameter that corresponds to a session between the computing device and the user device; and
   based on determining that the first state parameter is invalid:
   generate a new state parameter;
   redirect the web browser to a web page associated with the identity provider application by providing, to the web browser, a uniform resource locator (URL) associated with the identity provider application;
   receive, from the web browser, second data comprising:
   an indication of authentication, by the identity provider application, of a cookie corresponding to the user authentication credentials, and
   the new state parameter; and
   provide, to the user device and based on the second data, access to one or more services.

2. The computing device of claim 1, wherein the instructions, when executed by the one or more processors, cause the computing device to determine that the first state parameter is invalid by causing the computing device to:
   determine that the first state parameter is expired.

3. The computing device of claim 1, wherein the instructions, when executed by the one or more processors, cause the computing device to generate the new state parameter by causing the computing device to:
   provide the web browser a second cookie that comprises the new state parameter.

4. The computing device of claim 1, wherein the URL comprises a no retry indication that causes the identity provider application to generate an error when the cookie is invalid.

5. The computing device of claim 1, wherein the indication of the authentication of the user authentication credentials comprises a first authentication code, and wherein the indication of the authentication of the cookie comprises a second authentication code.

6. The computing device of claim 1, wherein the instructions, when executed by the one or more processors, further cause the computing device to:
   send, to the identity provider application, the indication of the authentication of the cookie; and
   receive, from the identity provider application, information corresponding to the user authentication credentials, wherein the instructions, when executed by the one or more processors, further cause the computing device to provide the access to the one or more services based on the information corresponding to the user authentication credentials.

7. The computing device of claim 1, wherein the instructions, when executed by the one or more processors, further cause the computing device to generate the new state parameter based on determining that the indication of the authentication of the user authentication credentials indicates that the user authentication credentials were successfully authenticated.

8. A method comprising:
   receiving, by a computing device and from a web browser executing on a user device, first data comprising:
   an indication of authentication, by an identity provider application executing on a second computing device, of user authentication credentials, and
   a first state parameter that corresponds to a session between the computing device and the user device; and
   based on determining that the first state parameter is invalid:
   generating a new state parameter;
   redirecting the web browser to a web page associated with the identity provider application by providing, to the web browser, a uniform resource locator (URL) associated with the identity provider application;
   receiving, from the web browser, second data comprising:
   an indication of authentication, by the identity provider application, of a cookie corresponding to the user authentication credentials, and
   the new state parameter; and
   providing, to the user device and based on the second data, access to one or more services.

9. The method of claim 8, wherein the determining that the first state parameter is invalid comprises:
   determining that the first state parameter is expired.

10. The method of claim 8, wherein the generating the new state parameter comprises:
   providing the web browser a second cookie that comprises the new state parameter.

11. The method of claim 8, wherein the URL comprises a no retry indication that causes the identity provider application to generate an error ifwhen the cookie is invalid.

12. The method of claim 8, wherein the indication of the authentication of the user authentication credentials comprises a first authentication code, and wherein the indication of the authentication of the cookie comprises a second authentication code.

13. The method of claim 8, further comprising:
   sending, to the identity provider application, the indication of the authentication of the cookie; and
   receiving, from the identity provider application, information corresponding to the user authentication credentials, wherein providing the access to the one or more services is based on the information corresponding to the user authentication credentials.

14. The method of claim 8, wherein the generating the new state parameter is based on determining that the indication of the authentication of the user authentication credentials indicates that the user authentication credentials were successfully authenticated.

15. One or more non-transitory computer-readable media storing instructions that, when executed by one or more processors of a computing device, cause the computing device to:

receive, from a web browser executing on a user device, first data comprising:

an indication of authentication, by an identity provider application executing on a second computing device, of user authentication credentials, and a first state parameter that corresponds to a session between the computing device and the user device; and based on determining that the first state parameter is invalid:

generate a new state parameter;

redirect the web browser to a web page associated with the identity provider application by providing, to the web browser, a uniform resource locator (URL) associated with the identity provider application;

receive, from the web browser, second data comprising:

an indication of authentication, by the identity provider application, of a cookie corresponding to the user authentication credentials, and the new state parameter; and provide, to the user device and based on the second data, access to one or more services.

16. The one or more non-transitory computer-readable media of claim 15, wherein the instructions, when executed by the one or more processors, cause the computing device to determine that the first state parameter is invalid by causing the computing device to:

determine that the first state parameter is expired.

17. The one or more non-transitory computer-readable media of claim 15, wherein the instructions, when executed by the one or more processors, cause the computing device to generate the new state parameter by causing the computing device to:

provide the web browser a second cookie that comprises the new state parameter.

18. The one or more non-transitory computer-readable media of claim 15, wherein the URL comprises a no retry indication that causes the identity provider application to generate an error when the cookie is invalid.

19. The one or more non-transitory computer-readable media of claim 15, wherein the indication of the authentication of the user authentication credentials comprises a first authentication code, and wherein the indication of the authentication of the cookie comprises a second authentication code.

20. The one or more non-transitory computer-readable media of claim 15, wherein the instructions, when executed by the one or more processors, further cause the computing device to:

send, to the identity provider application, the indication of the authentication of the cookie; and receive, from the identity provider application, information corresponding to the user authentication credentials, wherein the instructions, when executed by the one or more processors, further cause the computing device to provide the access to the one or more services based on the information corresponding to the user authentication credentials.

\* \* \* \* \*